United States Patent [19]

Siegel

[11] Patent Number: 5,467,463
[45] Date of Patent: Nov. 14, 1995

[54] SYSTEM INDEPENDENT TIMING REFERENCE FOR COMPUTER

[75] Inventor: Mark D. Siegel, Fort Worth, Tex.

[73] Assignee: Tandy Corporation, Fort Worth, Tex.

[21] Appl. No.: 842,441

[22] Filed: Feb. 27, 1992

[51] Int. Cl.[6] .................................................... G06F 7/02
[52] U.S. Cl. ................................................................ 395/550
[58] Field of Search .............................................. 395/550

[56] References Cited

U.S. PATENT DOCUMENTS

| | | | |
|---|---|---|---|
| 4,937,780 | 6/1990 | Geyer et al. | 364/DIG. 2 |
| 5,313,622 | 5/1994 | Truchard et al. | 395/550 |

*Primary Examiner*—Thomas M. Heckler
*Attorney, Agent, or Firm*—Haynes and Boone

[57] ABSTRACT

A system is disclosed which enables measurement of the elapse of a predetermined time period in a computer system by determining the speed of instruction cycle execution according to the number of instruction cycles occurring relative to system clock transitions. The result is a timing reference tailored for a specific function which is not intrusive of the system clock in the computer system, and is determined independently of the particular timing characteristics of the system. The elapsed time value corresponds to a function such as the time period for processing a data transfer command received by a CD-ROM drive. The system clock of the computer is used as a known timing reference and a software counter is incremented upon a transition in the system clock until the next transition in the system clock.

22 Claims, 1 Drawing Sheet

SYSTEM INDEPENDENT TIMING REFERENCE FOR COMPUTER

FIELD OF THE INVENTION

This invention relates in general to the determination of time intervals within a computer system and particularly to a method and apparatus for establishing a known time interval within a computer system for use as a reference standard to measure predefined time events.

BACKGROUND OF THE INVENTION

Computer systems are based primarily on the interconnection of a plurality of digital devices, each designed to accomplish a specific function. A typical computer system comprises a central processing unit for processing data and control information, memory for temporarily storing information, input/output devices such as keyboards, monitors, floppy disk drives, hard disk drives and CD-ROM drives, and additional hardware to allow the above mentioned devices to communicate with each other.

A processing problem may occur in a computer system when one device depends on the operating speed of another device in the performance of its specified function. This problem is exemplified with reference to a computer system interacting with a CD-ROM drive. A CD-ROM drive contains its own processor responsible for controlling its operation, reading of requested data and communicating with other devices. In most CD-ROM drives, however, the processor is slow compared with the central processing unit of a computer system. As a result, when the central processing unit of a computer system sends a command to a CD-ROM drive, the central processing unit has to wait for the processor in the CD-ROM drive to process the command before the central processing unit can send another command. A typical CD-ROM drive requires a particular time period, such as 53 milliseconds, for example, to process a command sent from the computer system. Thus, the central processing unit, after sending a command to a CD-ROM drive, must wait until this particular time interval has elapsed before sending a second command to the CD-ROM drive. If the second command is sent from the central processing unit to the drive prior to the elapse of the time interval, it is possible that the processor in the CD-ROM drive will never execute the second command.

Computer designers have attempted to solve the above delay problem in computer systems by allowing the faster devices to perform other functions while they are waiting for the slower devices to perform their functions. For instance, a central processing unit might update a video display while waiting for a hard disk drive to retrieve requested information. In the context of a computer system interacting with a CD-ROM drive, an improvement in the overall throughput of the computer system is accomplished if the central processing unit is allowed to process other commands during the time interval in which the drive is processing its commands. Efficiency in overall throughput of the computer system is unnecessarily reduced, however, if the central processing unit waits longer than the particular time before sending the CD-ROM drive its next command, because the CD-ROM drive would then be idle while waiting for the next command.

It is therefore desirable that the central processing unit process other commands only during the particular time interval in which the CD-ROM is processing its command and no longer, sending the second command to the CD-ROM drive immediately when the drive is ready to receive it. What is needed is a method that allows the central processing unit to send a command to a CD-ROM drive, process other information for exactly the time period the drive requires to process its command (e.g., 53 ms), and then send the CD-ROM drive another command.

Several methods have been utilized in computer systems to allow the central processing unit to measure the duration of particular processes. One method that is well known in the art is the use of a hardware interrupt timer. A hardware interrupt timer is a device attached to a system reference (a quartz crystal) in a computer system which counts the cycles generated by the system reference. When the interrupt timer counts a particular number of clock cycles, it generates an interrupt to a timer counter. The timer counter increments itself upon receipt of any interrupt from the interrupt timer. The timer counter can then be read by a central processing unit.

A problem with utilizing a hardware interrupt timer to measure the duration of particular processing intervals in a computer system is that such a timer is often unavailable or is not readily accessible to a programmer who desires to time particular events. For example, the timer may be unavailable because it is dedicated to the task of maintaining a system clock. A hardware interrupt timer is programmed to generate an interrupt to a timer counter every $\frac{1}{18}$th of a second, for example, so that the timer counter can maintain a current date and time. This system date and time is used by the operating system of the personal computer and by application programs to perform particular tasks at specified times, and to reference particular files with the time and date they were created, stored or last changed. The hardware interrupt timer is thus generally unavailable to be used for timing particular processes.

It is known to reprogram a personal computer's hardware interrupt timer for purposes of timing particular processes. The central processing unit reads the value in the timer counter and stores the value in a temporary register. The central processing unit then reprograms the hardware interrupt timer to correspond to a particular time interval of interest, and clears the timer counter to equal zero. The hardware interrupt timer interrupts the timer counter, in the manner discussed above, corresponding to the reprogrammed time interval. The central processing unit reads the timer counter for purposes of calculating particular time intervals. This method of reprogramming the hardware interrupt timer, although accurate in determining elapsed time, is very intrusive into the computer system and is not considered a desirable practice, since once a programmer changes the programmed value in the hardware interrupt timer, all processes, applications and the like that depend on the system clock will be affected. If processes are supposed to occur at specified intervals, or at particular preprogrammed times, and the system clock has been changed so that it does not accurately reflect the true calendar date and time, then those processes will not occur, or will occur at incorrect times.

Another method for measuring the duration of particular processes in a computer system is the utilization of a software timer loop. In this method, a programmer creates a software loop that increments a value in a particular memory location every time the loop is called. At specified intervals within a particular process of interest, the software loop is called, thereby incrementing the particular memory location. To time the duration of a particular process, the central processing unit clears the value in the particular memory location (e.g., sets the memory location to equal zero) at the start of a process, and then calls the software timer loop at specific intervals within the particular process. At the end of the process, the central processing unit "reads" the value in the particular memory location and multiplies this value against the number of instruction cycles that occurred during each loop. This multiplied value is then multiplied against the system reference (e.g., the time for each instruction cycle) to determine the total elapsed time for the particular process.

A software timer loop, although it is nonintrusive on the computer system, has several disadvantages. First, it is difficult to calculate how many instructions are executed between each call to the software loop because the central processing unit may be interrupted several times during the particular process of interest. This causes it to execute other instructions before returning to the particular process. Since the other instructions that are executed upon interrupt of the central processing unit do not include a call to the software loop, the software loop will not increment the memory location until the central processing unit returns from the interrupt. If these other instructions are executed, their absence from the timing calculation will result in an incorrect value for the elapsed time.

An additional problem associated with utilizing software timing loop for calculating elapsed time in a computer system is that the software loop is not aware of hardware timing variations between different computer systems. The software timer merely multiplies the total number of instructions executed against the system reference. However, in most computer systems, the system reference is not the sole determining factor of system speed. Other factors include the speed at which the central processing unit operates, the response time of the system memory, the loading of the system bus, and the layout of the system board.

In a multimedia computing environment interacting with a CD-ROM drive or in other computer systems in which it is desirable to maximize overall performance and data throughput, it would be desirable to improve the arrangement for accurately determining the elapsed time of particular processes in a manner which is neither intrusive on the computer system itself, nor dependent on the particular timing characteristics of the computer system.

SUMMARY OF THE INVENTION

The foregoing problems are solved and a technical advance is achieved by a method and apparatus of the present invention which enables an accurate timing reference in a computer system to be established for use in controlling the execution of particular functions. The timing reference is established by determining the speed of instruction cycle execution according to the number of instruction cycles occurring relative to system clock transitions. The result is a timing reference tailored for a specific function which is not intrusive of the system clock in the computer system, and is independent of the particular timing characteristics of the computer system.

In an illustrative embodiment, the timing reference is utilized for control of a specific function, such as the processing of a data transfer command by a CD-ROM drive. This timing reference is utilized by the system's central processing unit to allocate the performance of other functions following initiation of a data transfer command to the drive and then return to provide another data transfer command upon elapse of the time value, thereby increasing the efficiency of the system.

In a preferred embodiment, the invention establishes an accurate timing reference in a computer system for timing and controlling the execution of particular functions. A signal is read in the computer system that transitions from one value to another at a known rate. A determination is made of the speed of instruction cycle execution in the computer system according to the number of instruction cycles occurring in the time period between the transition of the signal from one value to another. The number of instruction cycles that will be executed in the time period is established based on the determined speed.

In another aspect, the present invention utilizes a system clock of the computer as a known timing reference for the purpose of determining the true system speed of the computer. The true system speed is utilized for the purpose of measuring the elapsed time for a particular process. A software counter is incremented on any transition (i.e., state change) in the system clock until the next transition in the system clock. The time elapsed from one transition in the system clock to the next transition is known, and in an illustrative embodiment is $1/18$ second, for example. The value in the incremented software counter is multiplied by the number of instruction cycles that were required to increment the software counter between system clock transitions. This multiplied value equals the total number of instruction cycles that occurred between system clock transitions. The multiplied value is then divided into the time between system clock transitions ($1/18$ second) to determine the time required for each instruction cycle. The time required for execution of each instruction cycle is the true system speed of the computer. Once the time required for each instruction cycle is known, the elapsed time for a particular process is established by multiplying the number of executed instruction cycles during a particular process by the time required for execution of each instruction cycle. The elapsed time can be utilized by determining the number of instruction cycles that must be executed during the interval, and then counting the instruction cycles occurring until that number is reached.

In another embodiment, the invention establishes an accurate timing reference in a computer system in which the timing reference is utilized by a central processing unit of said system to time and control the execution of data transfer commands to a CD-ROM drive and also the execution of other functions in the system while the commands are being processed by the drive. A signal is read in the computer system that transitions from one value to another at a known rate. A determination is made of the speed of instruction cycle execution in the system according to the number of instruction cycles occurring in the time period between the transition of the signal from one value to another. The number of instruction cycles executed in the time period required for the drive to process a data transfer command based upon the determined speed is then established. Finally, the number of instruction cycles executed by the system upon initiation of a data transfer command are counted, such that when the established number is reached execution of the central processing unit returns from performing the other functions to execute another data transfer command to the drive.

A technical advantage achieved with the present invention is the provision of a timing reference that does not change or alter the value stored in the system clock, and does not affect the system clock through modifications to a hardware interrupt timer. In this sense, the method is nonintrusive.

A further technical advantage achieved with the present invention is the provision of a timing reference which is determined independently of the microprocessor and system bus characteristics of the computer, providing an accurate measurement of timing of instruction cycle execution notwithstanding variations in system reference speed, memory response times, board layout and other characteristics of the particular system.

DESCRIPTION OF THE PREFERRED EMBODIMENT

Figure 1:
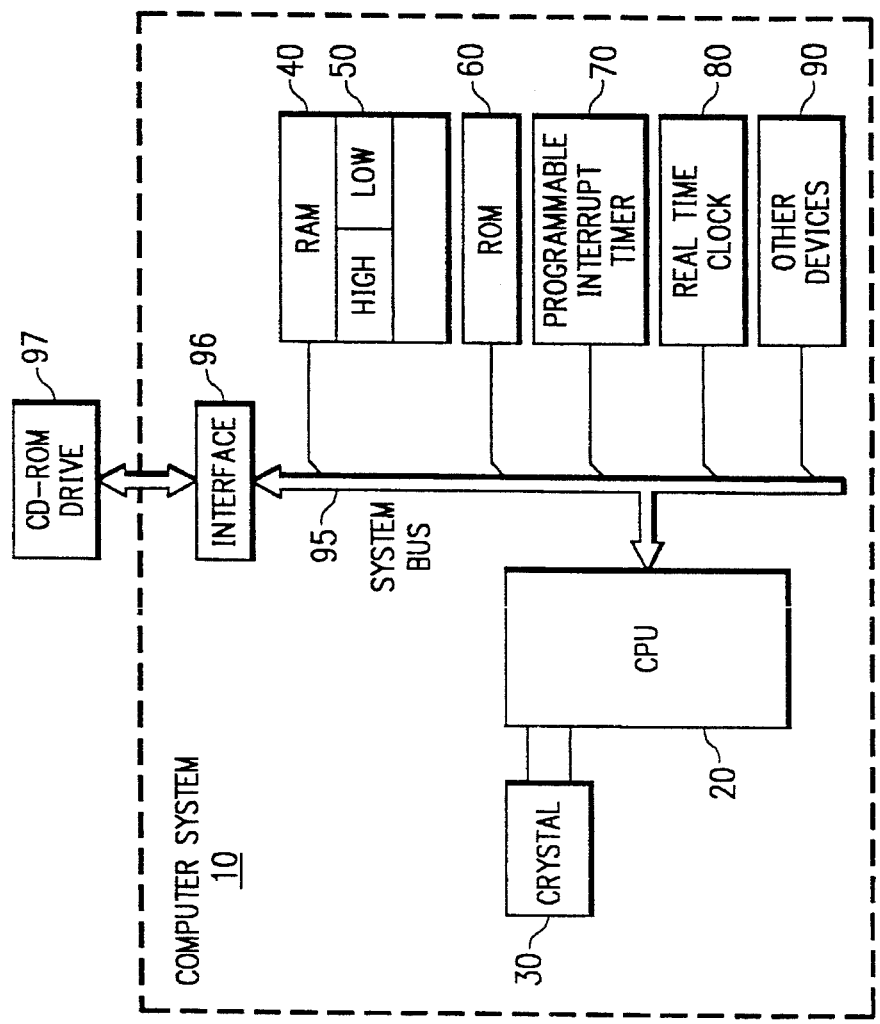
FIG. 1 is a functional block diagram of a computer system incorporating the method of the present invention.

In FIG. 1 of drawings, the reference numeral 10 refers to a computer system which is a personal computer or the like used in a standard or multimedia computing environment. A compact disk read-only-memory (CD-ROM) drive 12 is connected to the system 10. While not shown, it is understood that a plurality of other peripheral devices such as a keyboard, display or the like are also connected to the system 10. The computer system 10 includes a central processing unit (CPU) 14, a quartz crystal 16 and a system bus 18. An interface 20 connects the bus 18 to the drive 12. Also included in the system 10 and connected to the bus 18 is random access memory (RAM) 22, read-only-memory (ROM) 24, a programmable hardware interrupt timer 26, a battery backed-up real time clock 28, and other devices generally designated by the reference numeral 30 which are known by those skilled in the art for a complete and operative system.

The crystal 16 is electrically connected to the CPU 14 for the purpose of providing the CPU with a timing reference signal for the execution of the CPU's instructions. The CPU 14 is electrically connected to the RAM 22 via the system bus 18 and provides temporary data storage for digital information in the form of high and low bytes 22a, 22b to be processed by the CPU. The ROM 24 is also connected to the CPU 14 via the system bus 18 for the purpose of permanently storing instructions to be executed by the CPU. The timer 26 is electrically connected to the CPU 14 via the bus 18 and interrupts the CPU every 1/18 seconds, for example, for the purpose of maintaining the date and time value for the computer system 10. It is understood that the timer 26 may interrupt the CPU 14 more or less frequently, depending upon the requirements of the system 10. The clock 28 is electrically connected to the CPU 20 via the bus 18 and provides the CPU with information pertaining to the date and time upon boot-up of the computer system 10. The other devices 30 are connected to the CPU 14 via the System bus 18 and may include direct memory access (DMA) controllers, drives and other system bus devices well known to those skilled in the art.

In operation, upon boot-up the system 10 runs its diagnostics and loads its device drivers (not shown). The CPU 14, driven by the crystal 16, reads a value stored in the clock 28 corresponding to the current date and time. This value is then stored in an area of the RAM 22 and updated, as discussed below, to correspond to the change in time. The timer 26 is programmed to interrupt the CPU 14 every 1/18 second, causing the CPU to increment the value that was previously read from the clock 28 and stored in the RAM 22. Therefore, the value stored in the RAM 22 is continuously updated to correspond to the actual date and time.

Figure 2:
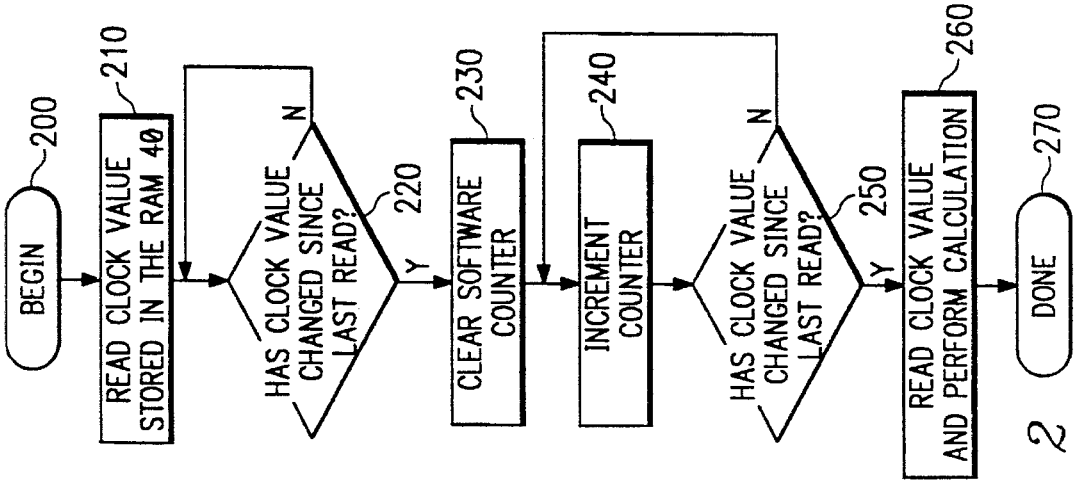
FIG. 2 is a functional flow chart illustrating the steps taken according to the method of the present invention.

In FIG. 2, a software routine is shown which implements a method of the invention for determining the true speed of the computer system 10. The true system speed is utilized to measure the elapsed time of a particular process, such as that of transferring data from the drive 12. After boot-up of the system 10, the routine monitors for a first transition in the clock value stored in the RAM 22. After the first transition, a software loop is started which monitors for a second transition in the clock value and increments a counter each time the loop is executed. Upon the second transition, the value of the counter is read indicating the number of times the loop was executed. This counter value is multiplied by the known number of instructions required for each loop. This multiplied value is divided into 1/18th second (the time elapsed between transitions in the clock value) to indicate the time required for execution of each instruction cycle.

More specifically, the software routine for determining the speed of the instruction cycles of the CPU 14 begins at step 200 when it is called from a main application (not shown) of the system 10. At step 202 the CPU 14 reads the clock value stored in the RAM 22 corresponding to the date and time of the computer system 10. This clock value is stored in a temporary register (not shown) within the CPU 14. At step 204, the clock value stored in the RAM 22 is read again. At step 206, a comparison is made between the clock value just read and the value previously stored in the temporary register. The comparison determines whether the clock value just read has changed from the initial clock value. As previously discussed, a transition in the clock value stored in the RAM 22 occurs every 1/18th second. If at step 206, the value stored in the temporary register is equal to the clock value, i.e., no transition has occurred in the system time, execution proceeds in a tight loop by returning to step 204 in order to again read the clock value. If at step 206 the value stored in the temporary register is not equal to the read clock value, i.e., a first transition has occurred in the system time, execution proceeds to step 208.

At step 208, a counter is cleared to equal zero. The counter comprises a memory location in the RAM 22 or in some other location, such as in a register of the CPU 14. At step 210, the clock value stored in the RAM 22 is read and stored in the temporary register. At step 212 the counter is incremented. At step 214, the clock value stored in the counter is again read. At step 216, a comparison is made between the clock value just read and the value previously stored in the temporary register at step 210. The comparison determines whether the clock value just read has changed from the previous clock value. If at step 216, the value stored in the temporary register is equal to the clock value, i.e., no transition has occurred in the system time, execution proceeds in a loop and returns to step 212 to increment the counter. If at step 216 the value stored in the temporary register is not equal to the read clock value, i.e., a first transition has occurred in the system time, execution proceeds to step 218.

At step 218, the value stored in the counter is read to determine how many times the counter was incremented at step 212. A calculation is performed in which this software counter value (Csw) is multiplied by a predetermined constant (K). The constant (K) corresponds to the number of instruction cycles of the system 10 required to perform the instructions of the software routine comprising steps 212, 214 and 216. The resulting product of the counter value and constant is equal the total number of instruction cycles executed between transitions in the value stored in the RAM 40.

The time period (Tc) between clock cycle transitions (which in this embodiment is 1/18 second) is then divided by the resulting product to determine the time (T) required to execute each instruction cycle. At step 220, execution is complete and control returns to the calling application.

The time (T) required to execute each instruction cycle is the true reference speed of the computer system 10 and may be represented by the following equation:

$$T=Tc/[(Csw)(K)];$$

where (Tc) represents the time between transitions of the clock value stored in the RAM 22 (1/18 seconds), (Csw) represents the counter value of the software routine and (K) represents the constant corresponding to the number of instruction cycles to perform the software counter loop, as described above.

As an example, if the number of instruction cycles required to perform the software loop is 55 cycles (K=55), and the counter value is 10,000 (Csw=10,000), then the total number of instruction cycles that occur between transitions in the clock value (Tc) stored in the RAM 22 is 55,000. Thus, 55,000 instruction cycles would have occurred during the 1/18th second interval between transitions in the value stored in the RAM 22. The total number of instruction cycles calculated above is divided into 1/18 second to determine the time required to execute each instruction cycle, which in the present instance is 0.000001 seconds. This value for (T) is the true reference of system speed for the computer system 10.

It is understood that once the value (T) corresponding to the time required to execute an instruction cycle is known, this value can be used in a variety of ways to determine the duration of a particular process, or to initiate a countdown timer for the purpose of initiating a particular process.

For example, in the illustrative embodiment of the present invention, the CD-ROM drive 12 is only capable of receiving a command from the computer system 10 every fifty-three milliseconds (53 ms). If two commands are sent from the computer system 10 to the CD-ROM drive 12 less than 53 ms apart, it is likely that the CD-ROM drive will not execute the second command. If two commands are sent from the computer system 10 to the CD-ROM drive 12 more than 53 ms apart, the CD-ROM drive will have to wait for the computer system 10, causing a delay in data transfer from the CD-ROM drive to the system. In either case, overall delays in processing information from the CD-ROM drive 12 occur.

In operation, the invention solves the foregoing problem by providing a reference to determine when 53 ms has passed between the time the computer system 10 sends a first command to the CD-ROM drive 12, and the time the computer system sends a second command to the CD-ROM drive. As described with respect to FIG. 2, the time (T) required for the computer system 10 to execute each instruction cycle is determined. This time (T) is divided into 53 ms to determine the number of instructions (I) that must be executed between commands sent from the computer system 10 to the CD-ROM drive 14. A software counter (not shown) is initiated that allows the computer system 10 to track the number of instruction cycles that are executed after a command is sent to the CD-ROM drive 12. When the number of instruction cycles executed after a command is sent to the CD-ROM drive 12 equals the number (I) corresponding to the number of instructions pertaining to 53 ms, the computer system 10 can send another command to the CD-ROM drive. This process continues as long as the computer system 10 requires information from the CD-ROM drive 12.

It is understood that once the time (T) required for executing each instruction cycle in the computer system 10 is calculated according to the method of the present invention, this value can be used in any variety of situations where system timing measurements must be made. It is also understood that the method for determining the time required for execution of each instruction cycle is independent of the speed of the system clock reference, the speed of the particular processor in the computer system, the loading or layout of the system bus, or other factors that contribute to the measured number of instruction cycles that occur within the time between system clock transitions. In addition, it is understood that the method of the present invention can be utilized for determining a timing reference in computer systems other than multimedia or personal computers (IBM or compatibles) since other computer systems have either a system clock, or some other reference that transitions at a constant rate throughout the operation of the computer.

Although illustrative embodiments of the present invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. A method for establishing an accurate timing reference in a computer system for use in timing and controlling the execution of particular functions, the method comprising:

reading a signal in said computer system that transitions from one value to another at a known rate;

determining a speed of instruction cycle execution in said computer system, said determining step comprising:
counting a first number of instruction cycles performed during a time period between transition of said signal from one value to another;
dividing said time period by said first number of instruction cycles;

establishing a second number of instruction cycles executed in a second time period required for an input/output device of said system to process a command from a central processing unit of said system based upon said determined speed; and counting instruction cycles executed by said system upon issuance of a command to said I/0 device; and issuing an indication signal to said central processing unit when said second number of instruction cycles has been executed, wherein responsive to said indication signal, execution of said central processing unit returns from performing other functions to issue another command to said I/0 device.

2. The method of claim 1 wherein one of said particular functions is the processing of a command for data transfer in a CD-ROM drive.

3. The method of claim 1 wherein said signal that transitions at a known rate is generated by a system clock.

4. The method of claim 1 wherein said determining step comprises:

storing said signal in a temporary memory location;

incrementing a counter;

reading said signal and comparing it to said stored signal, such that when said read signal is unchanged relative to said stored signal, execution returns to said incrementing operation; and reading the value of said incremented counter when said read signal is changed relative to said stored signal.

5. The method of claim 4 further comprising:

multiplying said incremented counter value by the number of instruction cycles required to perform said incrementing, reading and comparing operations, to thereby indicate the number of instruction cycles performed between said signal transitions.

6. A method for establishing an accurate timing reference in a computer system in which said timing reference is utilized by a central processing unit of said system to time and control the execution of data transfer commands to a drive and also the execution of other functions in said system while said commands are being processed by said drive, the method comprising:

reading a signal in said computer system that transitions from one value to another at a known rate;

determining a speed of instruction cycle execution in said computer system, said determining step comprising:

counting a first number of instruction cycles performed during a first time period between transition of said signal from one value to another; and dividing said first time period by said first number of instruction cycles;

establishing a second number of instruction cycles executed in a second time period required for said drive to process a data transfer command based upon said determined speed;

counting instruction cycles executed by said system upon initiation of a data transfer command; and issuing an indication signal to said central processing unit when said second number of instruction cycles has been executed, wherein responsive to said indication signal, execution of said central processing unit returns from performing said other functions to issue another data transfer command to said drive.

7. The method of claim 6 wherein said drive is a CD-ROM drive.

8. The method of claim 6 wherein said signal that transitions at a known rate is generated by a system clock.

9. The method of claim 6 wherein said determining step comprises:

storing said signal in a temporary memory location;

incrementing a counter;

reading said signal and comparing it to said stored signal, such that when said read signal is unchanged relative to said stored signal, execution returns to said incrementing operation; and reading the value of said incremented counter when said read signal is changed relative to said stored signal.

10. The method of claim 9 further comprising:

multiplying said incremented counter value by the number of instruction cycles required to perform said incrementing, reading and comparing operations, to thereby indicate the number of instruction cycles performed between said signal transitions.

11. A method for establishing an accurate timing reference in a computer system for use in timing and controlling the execution of particular functions, the method comprising:

reading a signal in said computer system that transitions from one value to another at a known rate;

storing said signal in a temporary memory location;

incrementing a counter;

reading said signal and comparing it to said stored signal, such that when said read signal is unchanged relative to said stored signal, execution returns to said incrementing operation;

reading the value of said incremented counter when said read signal is changed relative to said stored signal;

multiplying said incremented counter value by a number of instruction cycles required to perform said incrementing, reading and comparing operations, to thereby indicate a number of instruction cycles performed between said signal transitions;

dividing said known rate of said signal transition by said number of instruction cycles performed between said signal transitions, to thereby indicate a time required for execution of each instruction cycle;

establishing a second number of instruction cycles executed in a second time period required for an input/output device of said system to process a command from a central processing unit of said system based upon said time required for execution of each instruction cycle;

counting instruction cycles executed by said system upon initiation of a command to said I/O device; and issuing an indication signal to said central processing unit when said second number of instruction cycles has been executed, wherein responsive to said indication signal, execution of said central processing unit returns from performing other functions to execute another command to said I/O device.

12. Apparatus for establishing an accurate timing reference in a computer system for use in timing and controlling the execution of particular functions, the apparatus comprising:

means for reading a signal in said computer system that transitions from one value to another at a known rate; and means for determining a speed of instruction cycle execution in said computer system, said means for determining comprising:

means for counting a first number of instruction cycles performed during a time period between transition of said signal from one value to another; and means for dividing said time period by said first number of instruction cycles;

means for establishing a second number of instruction cycles executed in a second time period required for an input/output device of said system to process a command from a central processing unit of said system based upon said determined speed;

means for counting instruction cycles executed by said system upon issuance of a command to said I/O device; and means for issuing an indication signal to said central processing unit when said second number of instruction cycles has been executed, wherein responsive to said indication signal, execution of said central processing unit returns from performing other functions to issue another command to said I/O device.

13. The apparatus of claim 12 wherein one of said particular functions is the processing of a command for data transfer in a CD-ROM drive.

14. The apparatus of claim 12 wherein said signal that transitions at a known rate is generated by a system clock.

15. The apparatus of claim 12 wherein said determining means comprises:

means for storing said signal in a temporary memory location;

means for incrementing a counter;

means for reading said signal and comparing it to said stored signal, such that when said read signal is unchanged relative to said stored signal, execution returns to said incrementing operation; and means for reading the value of said incremented counter when said read signal is changed relative to said stored signal.

16. The apparatus of claim 15 further comprising:

means for multiplying said incremented counter value by the number of instruction cycles required to perform said incrementing, reading and comparing operations, to thereby indicate the number of instruction cycles performed between said signal transitions.

17. Apparatus for establishing an accurate timing reference in a computer system in which said timing reference is utilized by a central processing unit of said system to time and control the execution of data transfer commands to a drive and also the execution of other functions in said system while said commands are being processed by said drive, the apparatus comprising:

means for reading a signal in said computer system that transitions from one value to another at a known rate;

means for determining the speed of instruction cycle execution in said computer system according to the number of instruction cycles occurring in the time period between the transition of said signal from one value to another;

means for determining a speed of instruction cycle execution in said computer system, said means for determining comprising:

means for counting a first number of instruction cycles performed during a first time period between transition of said signal from one value to another; and means for dividing said first time period by said first number of instruction cycles;

means for establishing a second number of instruction cycles executed in a second time period required for said drive to process a data transfer command based upon said determined speed;

means for counting instruction cycles executed by said system upon initiation of a data transfer command; and means for issuing an indication signal to said central processing unit when said second number of instruction cycles has been executed, wherein responsive to said indication signal, execution of said central processing unit returns from performing said other functions to issue another data transfer command to said drive.

18. The apparatus of claim 17 wherein said drive is a CD-ROM drive.

19. The apparatus of claim 17 wherein said signal that transitions at a known rate is generated by a system clock.

20. The apparatus of claim 17 wherein said determining means comprises:

means for storing said signal in a temporary memory location;

means for incrementing a counter;

means for reading said signal and comparing it to said stored signal, such that when said read signal is unchanged relative to said stored signal, execution returns to said incrementing operation; and means for reading the value of said incremented counter when said read signal is changed relative to said stored signal.

21. The apparatus of claim 20 further comprising:

means for multiplying said incremented counter value by the number of instruction cycles required to perform said incrementing, reading and comparing operations, to thereby indicate the number of instruction cycles performed between said signal transitions.

22. Apparatus for establishing an accurate timing reference in a computer system for use in timing and controlling the execution of particular functions, the apparatus comprising:

means for reading a signal in said computer system that transitions from one value to another at a known rate;

means for storing said signal in a temporary memory location;

means for incrementing a counter;

means for reading said signal and comparing it to said stored signal, such that when said read signal is unchanged relative to said store signal, execution returns to said incrementing operation;

means for reading the value of said incremented counter when said read signal is changed relative to said stored signal;

means for multiplying said incremented counter value by a number of instruction cycles required to perform said incrementing, reading and comparing operations, to thereby indicate a number of instruction cycles performed between said signal transitions;

means for dividing said known rate of said signal transition by said number of instruction cycles performed between said signal transitions, to thereby indicate a time required for execution of each instruction cycle;

means for establishing a second number of instruction cycles executed in a second time period required for an input/output device of said system to process a command from a central processing unit of said system based upon said time required for execution of each instruction cycle;

means for counting instruction cycles executed by said system upon initiation of a command to said I/O device; and means for issuing an indication signal to said central processing unit when said second number of instruction cycles has been executed, wherein responsive to said indication signal, execution of said central processing unit returns from performing other functions to execute another command to said I/O device.

* * * * *